(12) United States Patent
Baskaran et al.

(10) Patent No.: US 11,290,874 B2
(45) Date of Patent: Mar. 29, 2022

(54) COMMUNICATION TERMINAL, NETWORK APPARATUS, COMMUNICATION METHOD, AND DE-CONCEALMENT METHOD

(71) Applicant: NEC CORPORATION, Tokyo (JP)

(72) Inventors: Sheeba Backia Mary Baskaran, Kandanchavadi (IN); Sivakamy Lakshminarayanan, Kandanchavadi (IN); Anand Raghawa Prasad, Tokyo (JP); Sivabalan Arumugam, Kandanchavadi (IN); Hironori Ito, Tokyo (JP); Takahito Yoshizawa, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 112 days.

(21) Appl. No.: 16/961,548

(22) PCT Filed: Jan. 9, 2019

(86) PCT No.: PCT/JP2019/000338
§ 371 (c)(1),
(2) Date: Jul. 10, 2020

(87) PCT Pub. No.: WO2019/139033
PCT Pub. Date: Jul. 18, 2019

(65) Prior Publication Data
US 2020/0344601 A1      Oct. 29, 2020

(30) Foreign Application Priority Data

Jan. 12, 2018  (IN) .............................. 201811001460

(51) Int. Cl.
*G06F 7/04*  (2006.01)
*H04N 7/16*  (2011.01)
(Continued)

(52) U.S. Cl.
CPC ........... *H04W 12/02* (2013.01); *H04W 12/03* (2021.01); *H04W 12/0471* (2021.01);
(Continued)

(58) Field of Classification Search
USPC ......................................................... 726/26
See application file for complete search history.

(56) References Cited

U.S. PATENT DOCUMENTS

| 2018/0013568 A1* | 1/2018 | Muhanna | ............ H04L 63/0428 |
| 2019/0149521 A1* | 5/2019 | Jerichow | ............... H04L 9/3226 |
| | | | 713/171 |
| 2019/0182654 A1* | 6/2019 | Jerichow | ............... H04W 8/183 |

OTHER PUBLICATIONS

"3rd Generation Partnership Project; Technical Specification Group Services and System Aspects Security Architecture and Procedures for 5G System (Release 15)", 3GPP TS 33.501 V0.6.0, Dec. 2017, pp. 1-79.
(Continued)

*Primary Examiner* — Jeffrey C Pwu
*Assistant Examiner* — Samuel Ambaye
(74) *Attorney, Agent, or Firm* — Sughrue Mion, PLLC

(57) ABSTRACT

A communication terminal (10) includes control means for generating a subscription concealed identifier (SUCI) including a subscription permanent identifier (SUPI) concealed using a predetermined protection scheme, and a protection scheme identifier identifying the protection scheme, and transmission means for sending the SUCI to a first network apparatus during a registration procedure, the SUCI being sent for a second network apparatus to de-conceal the SUPI from the SUCI based on the protection scheme used to generate the SUCI.

24 Claims, 5 Drawing Sheets

(51) Int. Cl.
   *H04W 12/02*      (2009.01)
   *H04W 12/06*      (2021.01)
   *H04W 12/10*      (2021.01)
   *H04W 12/03*      (2021.01)
   *H04W 12/72*      (2021.01)
   *H04W 12/0471*    (2021.01)

(52) U.S. Cl.
   CPC ........... *H04W 12/06* (2013.01); *H04W 12/10* (2013.01); *H04W 12/72* (2021.01)

(56) References Cited

OTHER PUBLICATIONS

"3rd Generation Partnership Project; Technical Specification Group Services and System Aspects System Architecture for the 5G System; Stage 2 (Release 15)", 3GPP TS 23.501 V15.0.0, Dec. 2017, pp. 1-181.

"SIDF purpose in initiation of authentication", Nokia, LG Electronics. CATT, 3GPP TSG SA WG3 (Security) Meeting #89, S3-173446, Nov. 27-Dec. 1, 2017, Reno (US), 2 pages.

"SUCI—format and generation", Ericsson, Vodafone, 3GPP TSG SA WG3 (Security) Meeting #88, S3-171786, Aug. 7-11, 2017, Dali, China, 1 page.

International Search Report for PCT/JP2019/000338 dated Apr. 9, 2019 (PCT/ISA/210).

\* cited by examiner

COMMUNICATION TERMINAL, NETWORK APPARATUS, COMMUNICATION METHOD, AND DE-CONCEALMENT METHOD

CROSS REFERENCE TO RELATED APPLICATIONS

This application is a National Stage of International Application No. PCT/JP2019/000338 filed Jan. 9, 2019, claiming priority based on Indian Patent Application No. 201811001460 filed Jan. 12, 2018, the disclosure of which is incorporated herein in its entirety by reference.

TECHNICAL FIELD

The present disclosure relates to a next-generation system that can include unified data management (UDM).

BACKGROUND ART

In the field of mobile communication systems, as disclosed in Non Patent Literature 1 and Non Patent Literature 2, the configuration of a next-generation system called 5G (5 Generation) is being studied. In the next-generation system, management of subscriber data and the like by unified data management (UDM) is being considered. UDM provides the subscription concealed identifier (SUCI) de-concealment (decryption) process based on subscription identifier de-concealing function (SIDF) services. SUCI is generated by user equipment (UE). SUCI includes a concealed subscription permanent identifier (SUPI).

In the SUCI de-concealment process based on the SIDF services, Non Patent Literature 1 discloses that UDM performs SUCI de-concealment to obtain SUPI. UDM selects an authentication method used for authentication processing between a terminal and a network based on SUPI.

CITATION LIST

Non Patent Literature

Non Patent Literature 1: 3GPP TS 33.501 V0.6.0 (2018-01), Security Architecture and Procedures for 5G System (Release 15)
Non Patent Literature 2: 3GPP TS 23.501 V15.0.0 (2017-12), System Architecture for 5G System; Stage 2 (Release 15)

SUMMARY OF INVENTION

Technical Problem

The related art described above has a problem in that UDM cannot execute the SUCI de-concealment process because a protection scheme used for concealment of SUPI is unknown to the UDM.

An object of the present disclosure is to provide a communication terminal, a network apparatus, and a method that solve the above problem.

Solution to Problem

A communication terminal according to a first aspect of the present disclosure comprises control means for generating a Subscription Concealed Identifier (SUCI) including a Subscription Permanent Identifier (SUPI) concealed using a predetermined protection scheme and a protection scheme identifier identifying the protection scheme, and transmission means for sending the SUCI to a first network apparatus during Registration Procedure, the SUCI being sent for a second network apparatus to de-conceal the SUPI from the SUCI based on the protection scheme used to generate the SUCI.

A network apparatus according to a second aspect of the present disclosure comprises reception means for receiving a message including a Subscription Concealed Identifier (SUCI) generated by a communication terminal, the SUCI including a Subscription Permanent Identifier (SUPI) concealed using a protection scheme and a protection scheme identifier identifying the protection scheme, and control means for de-concealing the SUPI from the SUCI based on the protection scheme used to generate the SUCI.

A communication method according to a third aspect of the present disclosure comprises generating a Subscription Concealed Identifier (SUCI) including a Subscription Permanent Identifier (SUPI) concealed using a predetermined protection scheme and a protection scheme identifier identifying the protection scheme, and sending the SUCI to a first network apparatus during Registration Procedure, the SUCI being sent for a second network apparatus to de-conceal the SUPI from the SUCI based on the protection scheme used to generate the SUCI.

A de-concealment method according to a fourth aspect of the present disclosure comprises receiving a message including a Subscription Concealed Identifier (SUCI) generated by a communication terminal, the SUCI including a Subscription Permanent Identifier (SUPI) concealed using a protection scheme and a protection scheme identifier identifying the protection scheme, and de-concealing the SUPI from the SUCI based on the protection scheme used to generate the SUCI.

Advantageous Effect of Invention

An effect in the present disclosure resides in that SUPI can be reliably acquired in a network.

DESCRIPTION OF EXAMPLE EMBODIMENT

Figure 1:
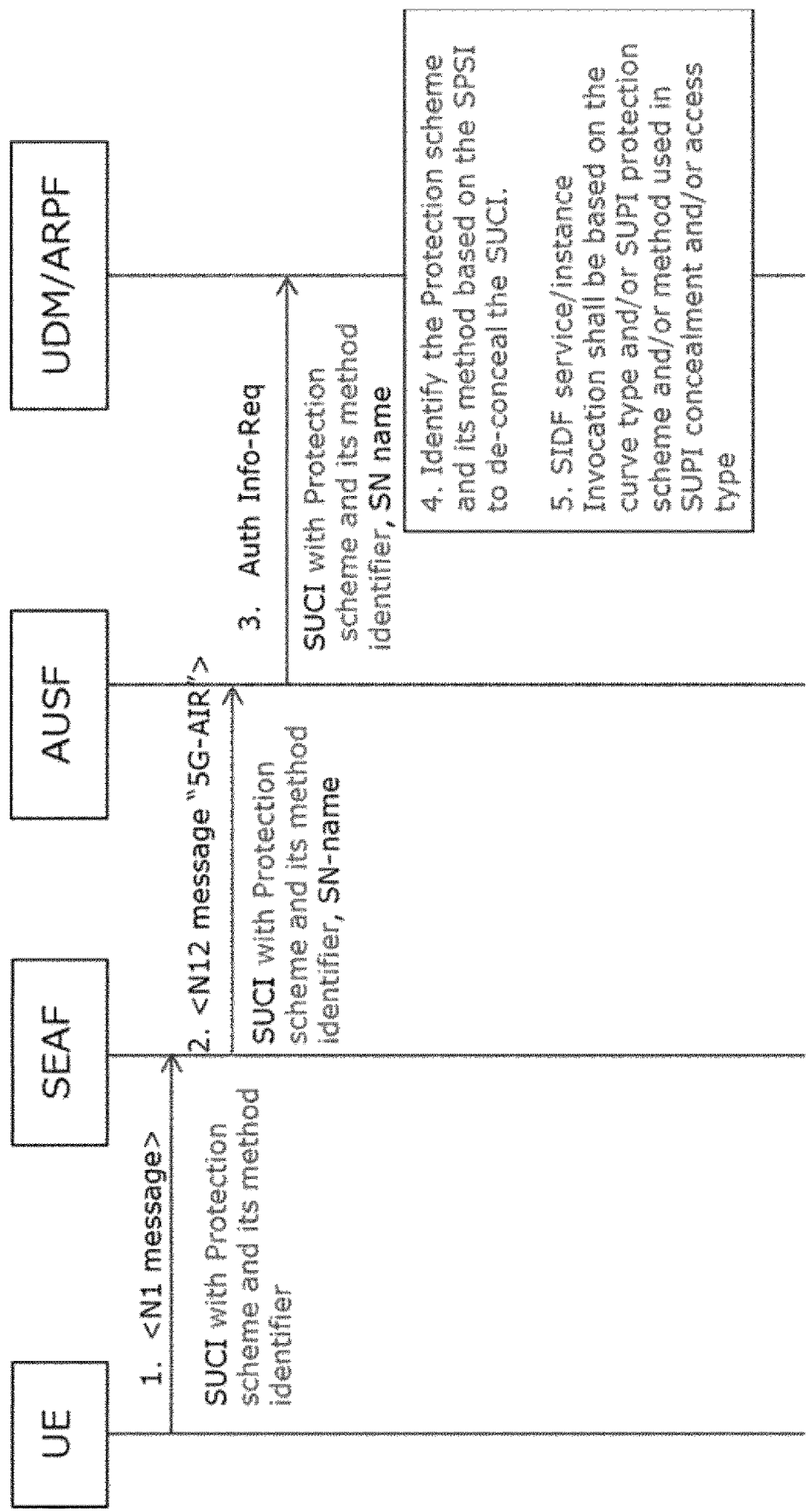
FIG. 1 is a diagram showing an SUPI protection scheme and identification of a method of the SUPI protection scheme, and SUPI de-concealment according to a first example embodiment.

The inventors state that there are the following two problems in the SUCI de-concealment process based on SIDF services.
(i) user equipment (UE) generates the SUCI from the subscription permanent identifier (SUPI), and there is a lack of notification of UE used SUPI protection scheme (SPSI: SUPI protection scheme identifier/indicator) to the core network.

(ii) Lack of protection for SPSI will make SPSI prone to tampering by attackers and will lead to SUPI de-concealment failure at the core network.

The above two problems will be described in detail below.

(i) Lack of SUPI Protection Scheme (SPSI) and its Method Indication

Unless a home network (PLMN: public land mobile network) knows which protection scheme (ex. SUPI concealment scheme and its method, or elliptic curve or security profile used in SUPI concealment) is being used by the UE for SUPI concealment, the home network will not be able to de-conceal the SUPI, and hence identification of a subscription/subscriber will not be possible.

The problem scenario is considered the following cases. Various elliptic curves proposed for SUPI concealment in 5G include secp384r1, NIST P-384, NIST P-256, brainpool384, brainpool256, M-383, Curve41417, and Curve25519. The UDM in the home network offers the SIDF service, where a UDM is required to handle the de-concealment of SUPIs with different protection schemes for a large number of subscribers simultaneously. A single point failure at UDM/SIDF will affect the entire SUPI de-concealment process in a PLMN.

(ii) Integrity of SUPI Protection Scheme Identifier (SPSI) and Protection of Confidentiality If SPSI sent by UE is not protected during the sending to the core network, the SPSI may get tampered by an attacker, and it will leave the core network unable to identify a right protection scheme, so that SUPI de-concealment process will fail.

First Example Embodiment

Solutions corresponding to the foregoing problems (i) and (ii) will be described in detail.

Solution of lack of SUPI protection scheme and its method indication (1) The proposed SPSI contains an indicator or a combination of indicators to identify a protection scheme and/or a method, and/or an elliptic curve (ECC curve) and/or a security profile used by UE to generate SUCI from SUPI.

Variant: The SUPI security profile identifier indicates a security profile that contains the security parameters such as a key derivation function (KDF), hash, a message authentication code (MAC), mackeylen, maclen, ENC, enckeylen, EC Diffie-Hellman primitive, EC domain parameters, point compression, backwards compatibility mode to support in SUCI de-concealment.

The SPSI is sent by the UE to the network along with the SUCI as its sub-parameter or as an individual parameter during a registration procedure.

Based on the SPSI received from the UE, the home network identifies the protection scheme or method, or the elliptic curve or the security profile used for SUPI concealment. The network uses this information to identify an appropriate protection scheme/method/ECC curve/security profile to de-conceal (decrypt) the SUPI from SUCI accordingly.

The SUPI protection scheme and its method identification and SUPI de-concealment will be described below with reference to FIG. 1. Numerals described below correspond to numerals shown in FIG. 1.

1. The SPSI is sent to authentication management field (AMF)/security anchor function (SEAF) by the UE in a registration request message along with the SUCI as an individual parameter or as a part of the SUCI. The registration request message is contained in an N1 message.

2. An authentication initiation request includes the SPSI if SEAF sends the SUCI in the authentication initiation request to the AUSF. Further, the authentication initiation request contains serving network (SN)-name. The authentication initiation request is contained in an N12 message.

3. The AUSF sends the authentication information request (Auth Info-Req) to UDM with the following information;
SUCI;
proposed SPSI;
serving network name;
an indication of whether the authentication is meant for 3GPP access or non-3GPP access; and
the number of authentication vectors (AVs) requested, in a case the AUSF is configured to run 5G-AKA.

4. Upon receiving the Auth Info-Req containing SUCI with SPSI, the UDM identifies the protection scheme and its method used for SUCI generation based on the SPSI.

5. The UDM invokes the corresponding UDM/SIDF instance or service to de-conceal the SUCI.

Variant for step 5: UDM instance invokes the SIDF service/functionality/function to de-conceal the SUCI.

The UDM may offer SIDF services specific to the different SUPI protection schemes supported in 5G (the UDM has/offers multiple SIDF instances or services or functionalities).

The UDM/AUSF invokes a right UDM/SIDF instance or SIDF service to de-conceal the SUCI based on a curve type and/or SUPI protection scheme and its method or a security profile used in SUPI concealment which are notified by the SPSI.

Or, UDM/AUSF invokes the right UDM/SIDF instance or SIDF service based on an access type.

Or, UDM/AUSF invokes the right UDM/SIDF instance or SIDF service to de-conceal SUPI based on SUPI types such as international mobile subscriber identify (IMSI) and non-IMSI types.

Or, UDM/AUSF invokes the right UDM/SIDF instance or SIDF service to de-conceal SUPI based on the service types or network slices provided to the UE.

Next, SUPI de-concealment and SIDF invocation by a home network for a subscription identification procedure initiated by a serving network will be described.

AUSF in a home network invokes SIDF in a case where the AUSF receives a subscription identification request/information request message from the serving network with SUCI and SPSI to de-conceal SUCI.

SPSI is notified to the AUSF by UE via the serving network.

A home network entity/AUSF invokes the right UDM/SIDF instance to de-conceal the SUCI based on the SUPI protection scheme indicated by the SPSI.

Next, SUCI de-concealment in case of single or multiple UDM instances will be described.

Variant 1: More than one UDM instance provide SIDF service, where each instance supports all the 5G supported SUPI protection schemes to prevent single point of failure.

Variant 2: More than one UDM instance provide SIDF service, where every instance supports a specific SUPI protection schemes used in 5G to prevent single point of failure.

Variant 3: For every SUPI protection scheme supported in 5G, multiple UDM instances may offer a similar service to prevent single point of failure.

Variant 4: Specific UDM/SIDF instance is assigned and invoked for handling a SUPI de-concealment service request from AUSF/UDM for entities outside PLMN.

Variant 5: Specific UDM/SIDF instance is assigned and invoked for handling a SUPI de-concealment service request from AUSF for 3rd party service providers.

Possible SUPI constructions and their formats will be described below. All the options listed below are related to the SUPI concealment method.

Option 1: <SUCI>||<Scheme ID>||<ECC Curve/Method Identifier (ID)>

Option 2: <SUCI>||<Scheme ID>||<Security Profile ID>

Option 3: scheme-output=<Scheme ID>||<ECC Curve/Method ID>

Option 4: scheme-output=<Scheme ID>||<Security Profile ID>

Option 5: scheme-output=<Scheme ID||Method ID>

Option 6: As separate parameters in the N1 message: <Scheme ID||Method ID>

Option 7: As separate parameters in the N1 message: <Scheme ID>

Option 8: As separate parameters in the N1 message: <Method ID>

Option 9: As separate parameters in the N1 message: <ECC Curve Type ID>

Option 10: As separate parameters in the N1 message: <Security Profile ID>

Option 11: It includes set of all options, where each of Options 1 to 10 is concatenated with MAC.

(2) Solution for lack of integrity protection of SUPI protection scheme identifier.

Figure 2:
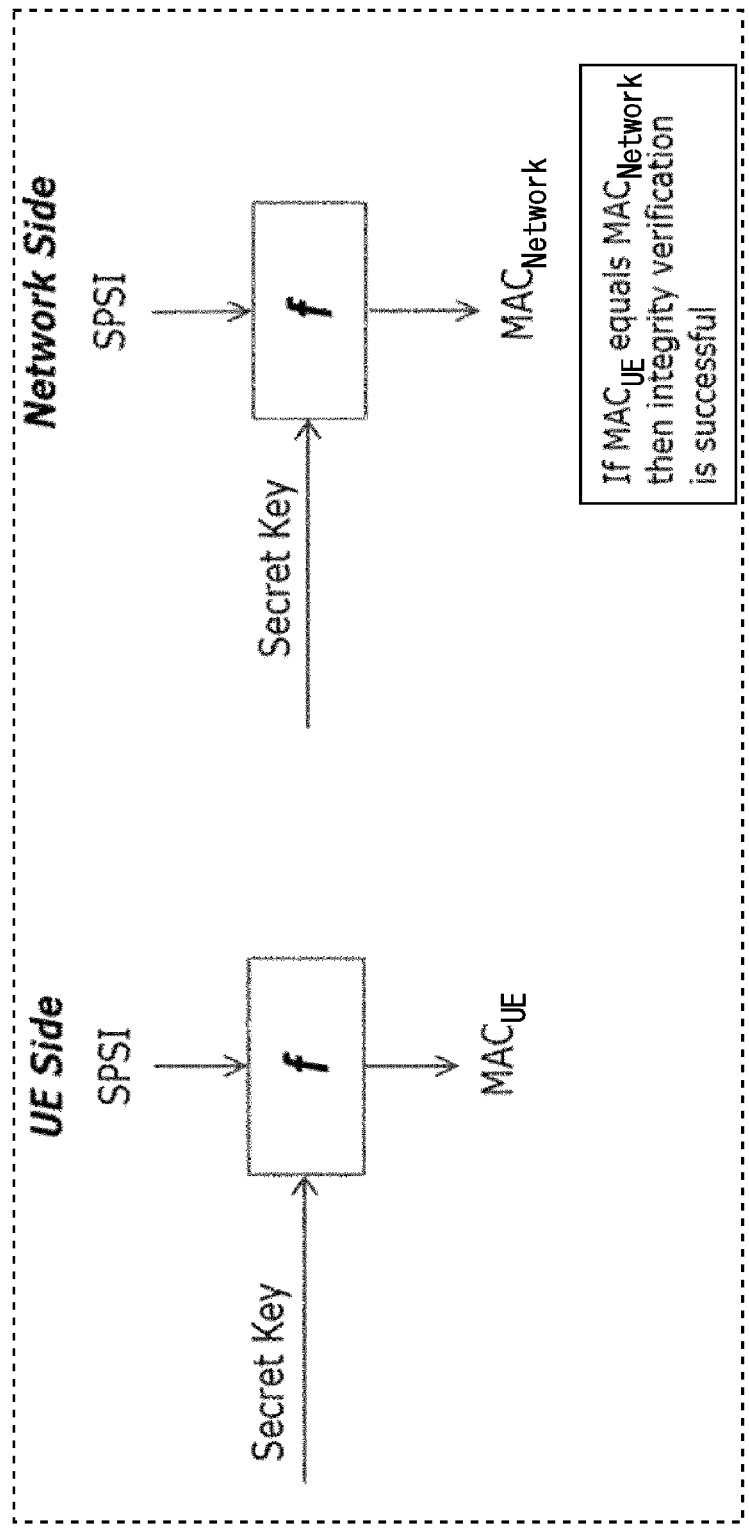
FIG. 2 is a diagram showing MAC generation and SPSI integrity verification process according to the first example embodiment.

The integrity of SPSI is protected by UE using a secret key shared between the UE and a home network. The secret key is pre-provisioned at UE by the home network or generated at the UE and the home network. If a shared secret key is used for SPSI integrity protection, it may be an ephemeral shared key, an ephemeral master shared key, an ephemeral mac key, or a key derived from these keys during execution of an elliptic curve integrated encryption scheme or other elliptic curve based protection schemes. The MAC generation and an SPSI integrity verification process is shown in FIG. 2.

The home network generates a MAC using a secret shared key and verifies the MAC of SPSI received from UE to check if the SPSI is not tampered by any attacker.

A function (f) used in MAC generation may be any mac algorithm such as NIA-1, NIA-2 or NIA-3.

Figure 3:
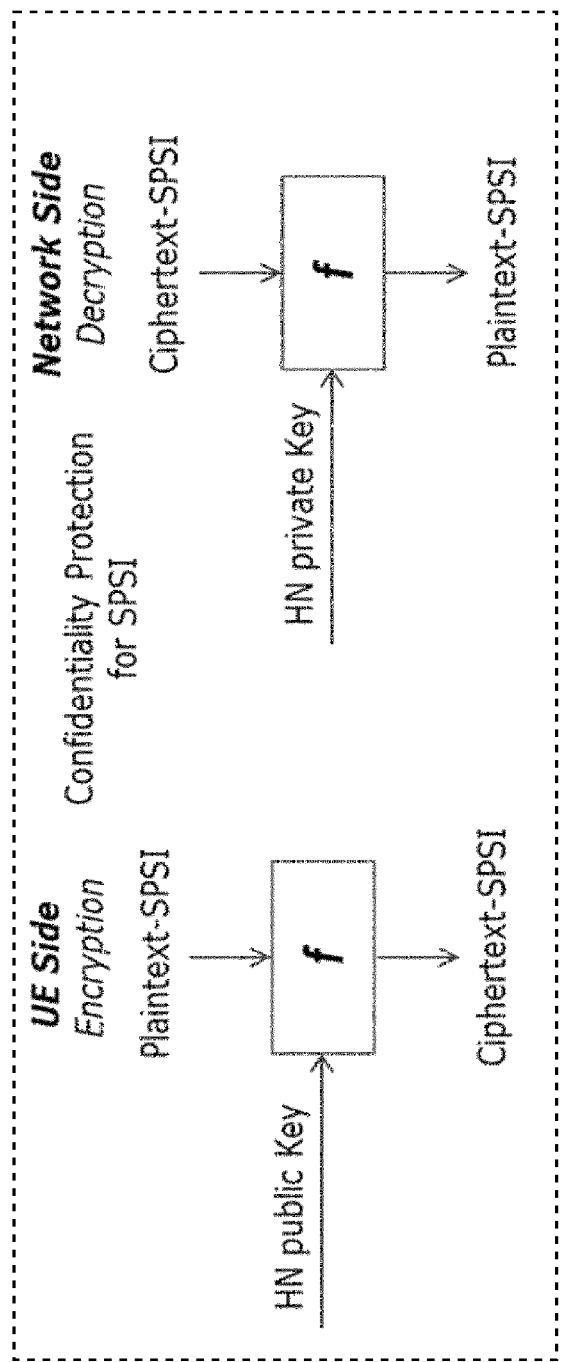
FIG. 3 is a diagram showing an SPSI encryption and decryption process according to the first example embodiment.

SPSI is optionally confidentiality protected by UE using an HN public key. If the SPSI is confidentiality protected, the home network decrypts the SPSI using its private key or a key derived from the private key. An SPSI encryption and decryption process is shown in FIG. 3.

Functions (f) are an encryption algorithm at a UE side and a decryption algorithm at a network side which are used for SPSI confidentiality protection. The SPSI confidentiality protection is based on public-key cryptography (asymmetric) encryption algorithms like RSA or elliptic curve cryptography (ECC) or any other schemes derived therefrom.

SPSI confidentiality has an advantage that the SPSI confidentiality ensures subscriber/subscription/user privacy in all scenarios including a case where a null scheme is used in SUPI concealment/protection.

If an algorithm or a function is used for integrity protection or encryption of SPSI, then (i) it may be negotiated between UE and a core network, or (ii) an algorithm ID/function ID may be sent by UE in a registration request.

In the present disclosure, identifiers shown below are used, and further functions shown below are executed:

1) identifier to identify an SUPI protection scheme and its method used in SUPI concealment;

2) identifier to identify an elliptic curve used in SUPI concealment;

3) identifier to identify a security profile used in SUPI concealment;

4) UDM/SIDF instance or service invocation specific to the protection scheme and method used in SUPI de-concealment;

5) UDM/SIDF instance or service invocation based on SUPI types or access types;

6) confidential protection of SPSI using an HN public key by UE; and 7) integrity protection of SPSI using UE and HN shared secret key.

A method for lack of SUPI protection scheme and its method indication includes the following steps.

1) UE sends an SUPI protection scheme and its method identifier or an elliptic curve identifier or a security profile identifier used during execution of SUPI concealment to a core network entity in order to support SUPI de-concealment at the core network.

2) UDM/SIDF at the core network invokes SIDF specific to the protection scheme and method used in the SUPI concealment.

A method for lack of integrity and confidentiality protection of SUPI protection scheme identifier includes the following steps.

1) The SPSI sent from UE to the core network is confidentiality protected using an HN public key.

2) The integrity of the SPSI sent from UE to the core network is protected using a shared secret key.

Note that the present disclosure is not limited to the above example embodiment, and can be modified as appropriate without departing from the subject matter of the present disclosure.

Subsequently, configuration examples of a communication terminal 10 and a network apparatus 20 described in the above example embodiment will be described.

Figure 4:
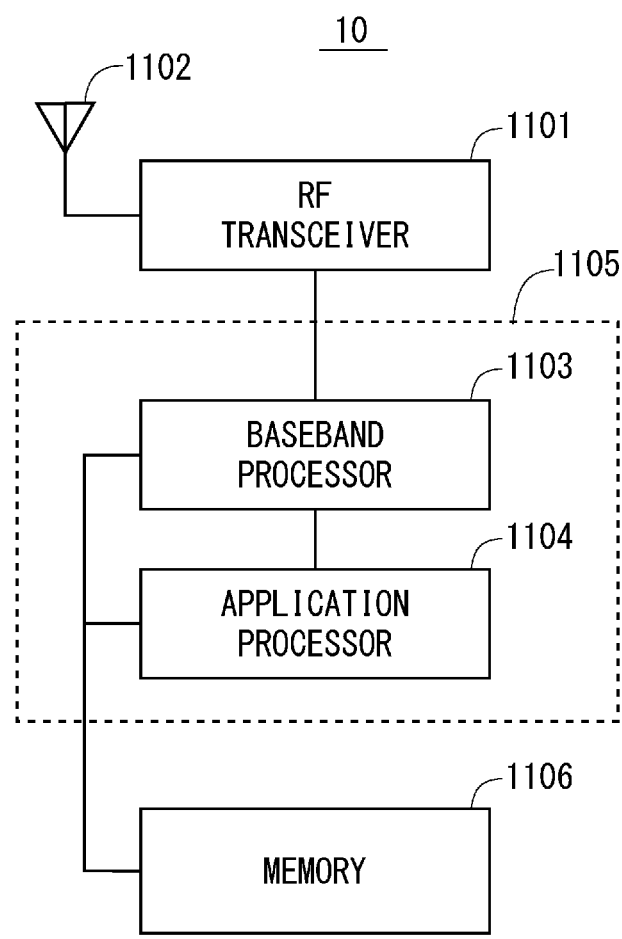
FIG. 4 is a configuration diagram of a communication terminal according to the example embodiment.

FIG. 4 is a block diagram showing a configuration example of the communication terminal 10. The communication terminal 10 may be UE. A radio frequency (RF) transceiver 1101 performs analog RF signal processing for communicating with a base station. The analog RF signal processing to be performed by the RF transceiver 1101 includes frequency up conversion, frequency down conversion, and amplification. The RF transceiver 1101 is coupled with an antenna 1102 and a baseband processor 1103. In other words, the RF transceiver 1101 receives modulation symbol data from the baseband processor 1103, generates a transmission RF signal, and supplies the transmission RF signal to the antenna 1102. The modulation symbol data may be orthogonal frequency division multiplexing (OFDM) symbol data. The RF transceiver 1101 also generates a baseband reception signal based on the reception RF signal received by the antenna 1102, and supplies this to the baseband processor 1103.

The baseband processor 1103 performs digital baseband signal processing (data plane processing) and control plane processing for wireless communication. The digital baseband signal processing includes (a) data compression/decompression, (b) data segmentation/concatenation, and (c) transmission format (transmission frame) generation/decomposition. Further, the digital baseband signal processing includes (d) channel coding/decoding, and (e) modulation (symbol mapping)/demodulation. Furthermore, the digital baseband signal processing includes (f) generation of OFDM symbol data (baseband OFDM signal) by inverse fast Fourier transform (IFFT), etc. The control plane processing includes communication management of a layer 1, a layer 2, and a layer 3. The layer 1 is, for example, transmission power control. The layer 2 is, for example, radio resource management and hybrid automatic repeat request (HARQ) processing. The layer 3 is, for example, signaling for attach, mobility, and call management.

For example, in a case of LTE and LTE-Advanced, the digital baseband signal processing by the baseband processor 1103 may include signal processing of a packet data convergence protocol (PDCP) layer, a radio link control (RLC) layer, an MAC layer, and a PHY layer. Further, the control plane processing by the baseband processor 1103 may include processing of a non-access stratum (NAS) protocol, an RRC protocol, and MAC CE.

The baseband processor 1103 may include a modem processor for performing the digital baseband signal processing and a protocol stack processor for performing the control plane processing. The modem processor is, for example, a digital signal processor (DSP). The protocol stack processor for performing the control plane processing is, for example, a central processing unit (CPU) or a micro processing unit (MPU). In this case, the protocol stack processor for performing the control plane processing may be shared with an application processor 1104 described later.

The application processor 1104 is also called a CPU, a MPU, a microprocessor, or a processor core. The application processor 1104 may include a plurality of processors (a plurality of processor cores). The application processor 1104 realizes various functions of the communication terminal 10 by executing a system software program and various application programs read from a memory 1106 or a memory (not shown). The system software program may be, for example, an operating system (OS). The application program may be, for example, a call application, a WEB browser, a mailer, a camera operation application, or a music reproduction application.

In some implementations, the baseband processor 1103 and the application processor 1104 may be integrated on a single chip, as indicated by a dashed line (1105) in FIG. 4. In other words, the baseband processor 1103 and the application processor 1104 may be implemented as a single system-on-chip (SoC) apparatus 1105. The SoC apparatus is also sometimes called a system large scale integration (LSI) or a chipset.

The memory 1106 is a volatile memory or a non-volatile memory, or a combination thereof. The memory 1106 may include multiple physically independent memory apparatuses. The volatile memory is, for example, a static random access memory (SRAM) or dynamic RAM (DRAM), or a combination thereof. The non-volatile memory is a mask read only memory (MROM), electrically erasable programmable ROM (EEPROM), a flash memory, a hard disk drive, or any combination thereof. For example, the memory 1106 may include an external memory apparatus accessible by the baseband processor 1103, the application processor 1104, and the SoC 1105. The memory 1106 may include a built-in memory apparatus which is integrated within the baseband processor 1103, the application processor 1104, or the SoC 1105. Further, the memory 1106 may include a memory within a universal integrated circuit card (UICC).

The memory 1106 may store a software module (computer program) including a command group and data for performing the processing by the communication terminal 10 described in the above example embodiment. In some implementations, the baseband processor 1103 or the application processor 1104 may be configured to perform the processing of the communication terminal 10 described in the above example embodiment by reading the software module from the memory 1106 and executing the read software module.

Figure 5:
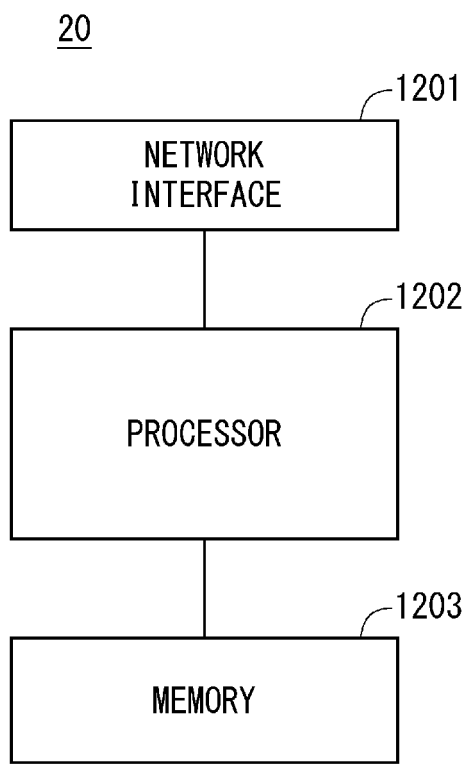
FIG. 5 is a configuration diagram of a network apparatus according to the example embodiment

FIG. 5 is a block diagram showing a configuration example of the network apparatus 20. The network apparatus 20 may be a core network apparatus. The core network apparatus may be an AMF entity, a UDM entity, a SEAF entity, an AUSF entity, or an ARPF entity. Referring to FIG. 5, the network apparatus 20 includes a network interface 1201, a processor 1202, and a memory 1203. The network interface 1201 is used to communicate with a network node (e.g., AN50, SMF30, etc.). The network interface 1201 may include, for example, a network interface card (NIC) conforming to Institute of Electrical and Electronics Engineers (IEEE) 802.3 series.

The processor 1202 reads software (computer program) from the memory 1203 and executes the read software to perform the processing of the network apparatus 20 described with reference to a sequence diagram and a flowchart in the above example embodiment. The processor 1202 may be, for example, a microprocessor, a MPU, or a CPU. The processor 1202 may include multiple processors.

The memory 1203 is configured by a combination of a volatile memory and a non-volatile memory. The memory 1203 may include a storage located remotely from the processor 1202. In this case, the processor 1202 may access the memory 1203 via an I/O interface (not shown).

In an example of FIG. 5, the memory 1203 is used to store a group of software modules. The processor 1202 can perform the processing of the network apparatus 20 described in the above example embodiment by reading this group of software modules from the memory 1203 and executing it.

As described with reference to FIGS. 4 and 5, each of the processors included in the communication terminal 10 and the network apparatus 20 in the above-described example embodiment executes one or more programs containing a command group for causing a computer to execute the algorithm described with reference to the drawings. This program can be stored using various types of non-transitory computer readable media, and can be supplied to a computer. The non-transitory computer readable media include various types of tangible storage media. Examples of the non-transitory computer readable media include a magnetic recording medium, a magneto-optical recording medium (for example, a magneto-optical disk), a compact disc read only memory (CD-ROM), CD-R, CD-R/W, and a semiconductor memory. The magnetic recording medium may be a flexible disk, a magnetic tape, or a hard disk drive. The semiconductor memory may be, for example, mask ROM, programmable ROM (PROM), erasable PROM (EPROM), flash ROM, or a random access memory (RAM). For example, the program may be supplied to the computer by various types of transitory computer readable media. Examples of the transitory computer readable media include electrical signals, optical signals, and electromagnetic waves. The transitory computer readable medium can supply the program to the computer via a wired communication path such as an electric wire or an optical fiber, or a wireless communication path.

Although the present disclosure has been described with reference to the example embodiment, the present disclosure is not limited to the above example embodiment. Various modifications that can be understood by those skilled in the art can be made to the configuration and details of the present disclosure within the scope of the disclosure.

A part or whole of the example embodiment disclosed above can be described as, but not limited to, the following appendices.

(Supplementary Note 1)

A communication terminal comprising:

control means for generating a Subscription Concealed Identifier (SUCI) including a Subscription Permanent Identifier (SUPI) concealed using a predetermined protection scheme and a protection scheme identifier identifying the protection scheme; and transmission means for sending the SUCI to a first network apparatus during a Registration procedure, the SUCI being sent for a second network apparatus to de-conceal the SUPI from the SUCI based on the protection scheme used to generate the SUCI.

(Supplementary Note 2)

The communication terminal according to Supplementary note 1, wherein the transmission means sends the SUCI included in a NAS message.

(Supplementary Note 3)

The communication terminal according to Supplementary note 2, wherein the NAS message is a Registration Request message.

(Supplementary Note 4)

The communication terminal according to any one of Supplementary notes 1 to 3, wherein the second network apparatus is a second core network apparatus.

(Supplementary Note 5)

The communication terminal according to Supplementary note 4, wherein the second core network apparatus is a Unified Data Management (UDM).

(Supplementary Note 6)

The communication terminal according to any one of Supplementary notes 1 to 5, wherein the first network apparatus is a first core network apparatus.

(Supplementary Note 7)

The communication terminal according to Supplementary note 6, wherein the first core network apparatus is an Authentication Management Field (AMF).

(Supplementary Note 8)

The communication terminal according to any one of Supplementary notes 1 to 7, wherein the protection scheme identifier identifies a profile.

(Supplementary Note 9)

A network apparatus comprising:

reception means for receiving a message containing a Subscription Concealed Identifier (SUCI) generated by a communication terminal, the SUCI including a Subscription Permanent Identifier (SUPI) concealed using a predetermined protection scheme and a protection scheme identifier identifying the protection scheme; and control means for de-concealing the SUPI from the SUCI based on the protection scheme used to generate the SUCI.

(Supplementary Note 10)

The network apparatus according to Supplementary note 9, wherein the network apparatus is a core network apparatus.

(Supplementary Note 11)

The network apparatus according to Supplementary note 10, wherein the core network apparatus is a Unified Data Management (UDM).

(Supplementary Note 12)

A communication method comprising:

generating a Subscription Concealed Identifier (SUCI) including a Subscription Permanent Identifier (SUPI) concealed using a predetermined protection scheme and a protection scheme identifier identifying the protection scheme; and sending the SUCI to a first network apparatus during a Registration Procedure, the SUCI being sent for a second network apparatus to de-conceal the SUPI from the SUCI based on the protection scheme used to generate the SUCI.

(Supplementary Note 13)

The communication method according to Supplementary note 12, wherein the SUCI is sent included in a NAS message when the SUCI is sent to the first network apparatus during the Registration Procedure.

(Supplementary Note 14)

The communication method according to Supplementary note 13, wherein the NAS message is a Registration Request message.

(Supplementary Note 15)

The communication method according to any one of Supplementary notes 12 to 14, wherein the second network apparatus is a second core network apparatus.

(Supplementary Note 16)

The communication method according to Supplementary note 15, wherein the second core network apparatus is a Unified Data Management (UDM).

(Supplementary Note 17)

The communication method according to any one of Supplementary notes 12 to 16, wherein the first network apparatus is a first core network apparatus.

(Supplementary Note 18)

The communication method according to Supplementary note 17, wherein the first core network apparatus is an Authentication Management Field (AMF).

(Supplementary Note 19)

The communication method according to any one of Supplementary notes 12 to 18, wherein the protection scheme identifier identifies a profile.

(Supplementary Note 20)

A de-concealment method comprising:

receiving a message containing a Subscription Concealed Identifier (SUCI) generated by a communication terminal, the SUCI including a Subscription Permanent Identifier (SUPI) concealed using a protection scheme and a protection scheme identifier identifying the protection scheme; and de-concealing the SUPI from the SUCI based on the protection scheme used to generate the SUCI.

(Supplementary Note 21)

The de-concealment method according to Supplementary note 20, wherein the de-concealment method is performed in a core network apparatus.

(Supplementary Note 22)

The de-concealment method according to Supplementary note 21, wherein the core network apparatus is a Unified Data Management (UDM).

REFERENCE SINGS LIST 10 communication terminal
20 network apparatus
1101 RF transceiver
1102 antenna
1103 baseband processor
1104 application processor
1105 SoC
1106 memory
1201 network interface
1202 processor
1203 memory

The invention claimed is:

1. A user equipment (UE) comprising:
   a controller configured to generate a Subscription Concealed Identifier (SUCI), wherein the SUCI includes:
   a Subscription Permanent Identifier (SUPI) concealed using a protection scheme and
   a protection scheme identifier identifying the protection scheme used to conceal the SUPI; and
   a transmitter configured to send the SUCI to a first network apparatus during a Registration procedure, the SUCI being sent for a second network apparatus to de-conceal the SUCI to the SUPI based on the protection scheme used to generate the SUCI,
   wherein the protection scheme identifier is concealed.

2. The UE according to claim 1, wherein the transmitter is configured to send the SUCI included in a non-access stratum (NAS) message.

3. The UE according to claim 2, wherein the NAS message is a Registration Request message.

4. The UE according to claim 1, wherein the second network apparatus is a second core network apparatus.

5. The UE according to claim 4, wherein the second core network apparatus is a Unified Data Management (UDM).

6. The UE according to claim 1, wherein the first network apparatus is a first core network apparatus.

7. The UE according to claim 1, wherein the protection scheme identifier identifies a profile.

8. A network apparatus comprising:
   a receiver configured to receive a message containing a Subscription Concealed Identifier (SUCI) generated by a user equipment, wherein the SUCI includes:
   a Subscription Permanent Identifier (SUPI) concealed using a protection scheme and
   a protection scheme identifier identifying the protection scheme; and
   a controller configured to de-conceal the SUCI to the SUPI based on the protection scheme used to generate the SUCI,
   wherein the protection scheme identifier is concealed.

9. The network apparatus according to claim 8, wherein the network apparatus is a core network apparatus.

10. The network apparatus according to claim 9, wherein the core network apparatus is a Unified Data Management (UDM).

11. A communication method comprising:
    generating a Subscription Concealed Identifier (SUCI)), wherein the SUCI includes:
    a Subscription Permanent Identifier (SUPI) concealed using a protection scheme and
    a protection scheme identifier identifying the protection scheme used to conceal the SUPI; and
    sending the SUCI to a first network apparatus during a Registration Procedure, the SUCI being sent for a second network apparatus to de-conceal the SUCI to the SUPI based on the protection scheme used to generate the SUCI,
    wherein the protection scheme identifier is concealed.

12. The communication method according to claim 11, wherein the SUCI is sent included in a NAS message in a case where the SUCI is sent to the first network apparatus during the Registration Procedure.

13. The communication method according to claim 12, wherein the NAS message is a Registration Request message.

14. The communication method according to claim 11, wherein the second network apparatus is a second core network apparatus.

15. The communication method according to claim 14, wherein the second core network apparatus is a Unified Data Management (UDM).

16. The communication method according to claim 11, wherein the first network apparatus is a first core network apparatus.

17. The communication method according to claim 11, wherein the protection scheme identifier identifies a profile.

18. A de-concealment method comprising:
    receiving a message containing a Subscription Concealed Identifier (SUCI) generated by a user equipment, wherein the SUCI includes:
    a Subscription Permanent Identifier (SUPI) concealed using a protection scheme and
    a protection scheme identifier identifying the protection scheme; and
    de-concealing the SUCI to the SUPI based on the protection scheme used to generate the SUCI,
    wherein the protection scheme identifier is concealed.

19. The de-concealment method according to claim 18, wherein the de-concealment method is performed in a core network apparatus.

20. The de-concealment method according to claim 19, wherein the core network apparatus is a Unified Data Management (UDM).

21. The UE according to claim 4, wherein the second core network apparatus is a Subscription Identifier De-concealing Function (SIDF).

22. The network apparatus according to claim 9, wherein the core network apparatus is a Subscription Identifier De-concealing Function (SIDF).

23. The communication method according to claim 14, wherein the second core network apparatus is a Subscription Identifier De-concealing Function (SIDF).

24. The de-concealment method according to claim 19, wherein the core network apparatus is a Subscription Identifier De-concealing Function (SIDF).

* * * * *